US00RE39284E

(19) United States
(12) Reissued Patent
Marisetty

(10) Patent Number: US RE39,284 E
(45) Date of Reissued Patent: Sep. 12, 2006

(54) METHOD AND APPARATUS FOR REDUCING POWER CONSUMPTION IN A SYSTEM USING POWER MANAGEMENT SOFTWARE CAPABLE OF PLACING MULTIPLE CONFIGURABLE SYSTEM DEVICES IN A REDUCED POWER CONSUMPTION STATE

(75) Inventor: Suresh K. Marisetty, San Jose, CA (US)

(73) Assignee: Intel Corporation, Santa Clara, CA (US)

(21) Appl. No.: 09/224,620

(22) Filed: Dec. 31, 1998

Related U.S. Patent Documents

Reissue of:
(64) Patent No.: 5,590,342
Issued: Dec. 31, 1996
Appl. No.: 08/346,040
Filed: Nov. 29, 1994

(51) Int. Cl.
*G06F 13/00* (2006.01)

(52) U.S. Cl. ..... 713/324; 710/100; 710/104
(58) Field of Classification Search ..... 713/322, 713/323, 324, 321; 710/104, 8, 10
See application file for complete search history.

(56) References Cited

U.S. PATENT DOCUMENTS 5,167,024 A * 11/1992 Smith et al. ..... 713/322
5,276,888 A * 1/1994 Kardach et al. ..... 708/131
5,404,321 A * 4/1995 Mattox ..... 710/261
5,404,546 A * 4/1995 Stewart ..... 713/322
5,560,022 A 9/1996 Dunstan et al.

OTHER PUBLICATIONS

Intel Corporation, "Power Management Coordinator API Specification," Apr., 1994.

* cited by examiner

*Primary Examiner*—Glenn A. Auve
(74) *Attorney, Agent, or Firm*—Jeffrey S. Draeger

(57) ABSTRACT

A power management mechanism for use in a computer system having a bus, a memory for storing data and instructions, and a central processing unit (CPU). The CPU runs an operating system having a power management virtual device driver (PMV×D) responsible for performing idle detection for devices. The PMV×D performs idle detection using event timers that provide an indicator as to the activity level. The PMV×D places idle local devices in a reduced power consumption state when no activity has occurred for a predetermined period of time.

78 Claims, 7 Drawing Sheets

METHOD AND APPARATUS FOR REDUCING POWER CONSUMPTION IN A SYSTEM USING POWER MANAGEMENT SOFTWARE CAPABLE OF PLACING MULTIPLE CONFIGURABLE SYSTEM DEVICES IN A REDUCED POWER CONSUMPTION STATE

Matter enclosed in heavy brackets [ ] appears in the original patent but forms no part of this reissue specification; matter printed in italics indicates the additions made by reissue.

*RELATED APPLICATIONS*

*An additional Reissue application Ser. No. 10/081,659, was filed on Feb. 21, 2002 as a divisional of the present reissue application Ser. No. 09/224,620.*

FIELD OF THE INVENTION

The present invention relates to the field of computer systems; more particularly, the present invention relates to reducing power consumption in a computer system using device drivers.

BACKGROUND OF THE INVENTION

Typically, a computer system contains a processor, a bus, and other peripheral devices. The processor is responsible for executing instructions using data in the computer system. The bus is used by the processor and the peripheral devices for transferring information between one another. The information on the bus usually includes data, address and control signals. The peripheral devices comprise storage devices, input/output (I/O) devices, etc. Generally, all operations being performed in the computer system occur at the same frequency.

Many of today's computer systems include power management capabilities. Power management is used to reduce the dynamic and static power consumption of a system to increase the battery life of a mobile personal computer (PC) or to reduce the energy costs associated with a desktop PC. Dynamic power is consumed by all components during state switching of internal electronic circuits, while static power is consumed due to the leakage currents of electronic devices.

The existing power-management techniques in a typical notebook and desktop PC use specific hardware mechanisms to provide maximum power savings. These hardware mechanisms use processor specific interrupts (e.g., System Management Interrupt (SMI)) and other system activity monitoring hardware (e.g., idle timers and hardware trapping mechanisms) to provide a reasonable amount of power conservation.

Alternatively, some software mechanisms exist, which are used today to detect CPU idle conditions in order to put the system in an optimum power conservation mode (e.g., Windows APM driver, DOS POWER.EXE, etc.). Although the available software techniques provide for about seventy to eighty percent of power conservation, they do not power manage a system beyond CPU idleness. That is, they do not detect idleness of I/O devices nor turn off idle I/O devices during system operation or slow the CPU clock rate, etc.

In existing power management architecture's, there are several dynamic and static power conservation states. One of these states is referred to as a fully on or full power on state, in which all the components of a typical system are powered.

In this state, all the clocks in the system will be running at full speed. This state offers no power savings. Another state is referred to as a local stand-by, or partially powered-on, state, in which certain temporarily idle local devices in the system, such as a floppy device, graphics devices (e.g., LCD, CRT), hard disk device, etc. are powered down. The power to these turned off devices is restored when an internal or external system event requires the services of these resources. The system maintains idle timers for each of these power-manageable devices. The idle timers enter an expired time-out state when they detect idleness of these devices after a pre-defined period of inactivity, and notifies the power management software. This state offers the minimal amount of power savings in a system. Another state is referred to as a global stand-by state, in which most of the system devices are powered down with the exception of the CPU and the system DRAM memory. The clock to the CPU is stopped with the DRAM memory operating in an extended power conservation mode, sometimes referred to as stand-by mode with self refresh. At this point in time, the CPU and DRAM are ready to be activated when a system event occurs. An example of such a system event is a keyboard/mouse click or other system interrupts (e.g., IRQ0–IRQ15, NMI, SMI, etc.). The last power management state is referred to as hibernation, where the system is put in the power-off state. When a system detects an idle condition, after a predetermiend period of time in the global stand-by mode, it can initiate a transfer to the hibernation state. In such a state, complete system state is saved to the hard disk. When the system is turned back on, the hibernation state restores the system back to exactly the same state as it was before.

Dynamic clock throttling is the state where the dynamic power consumed by a CPU is reduced by slowing its clock rate. A slow clock to the CPU is emulated by periodic assertion and de-assertion of a stpclk (stop clock) signal. This slow clock emulation leads to less power consumption by the overall system. This mode is activated during normal operation of a system and it is overlapped with a fully-on state to offer additional power savings during the fully-on state.

As shown above, the prior art system of power management requires the detection of local and global system events. This is typically handled by special hardware or power-aware applications and device drivers. The detection of system idleness for global stand-by is accomplished by monitoring their interrupt activity in software or hardware using existing methods. If none of the system interrupts are activated in a predetermined of time, a global stand-by event is generated by the chosen hardware or software mechanism. Local activity or individual I/O devices is detected mostly by dedicated power management hardware. The hardware snoops on I/O device resources (e.g., I/O addresses and IRQx, etc.). The mapping of the resources is static and deterministic and known at system boot-up time. These I/O resource mappings do not change over the lifetime of the current system boot. In certain power management implementations, the snoop I/O addresses are programmable in the I/O hardware, while they are fixed in other systems. The deterministic nature of the mappings of these I/O resources of the local devices (as per PC-AT/DOS standards) makes it easy to design standard hardware which is consistent across all PC DOS platforms.

These described methodologies have several inherent problems. For instance, each of the I/O devices needs an idle timer to monitor the activity. This imposes a restriction on a number of hardware timers that can be designed into the system. Also, most implementations hardcode the I/O trapping address of the I/O devices to save "gates". This makes a system more sensitive to remapping of the I/O resources. Furthermore, the existing mechanisms assume that all I/O devices use standard I/O resource mappings over the lifetime of the system, i.e., static I/O and IRQx mapping. This, in fact, places a severe restriction on the usage of the system resources and demands perfect hardware compatibility across all platforms.

Power management software in the traditional system is completely decoupled from the operating system and application. This makes the system prone to the operating system and power management software performing activities, with neither of them being aware of the activities being performed by the other. This may lead to system crashes where a power management interrupt, such as SMI, takes control away from the operating system while it is executing in the middle of a critical section of code.

The current generation of device drivers in operating systems virtualize I/O ports. When the I/O ports are virtualized, it becomes difficult, and in some cases impossible, for the power management software and hardware to detect any possible remappings. This leads the power management hardware to monitor and trap on invalid I/O device addresses, thereby generating improper events in the system.

In a plug-and-play environment, it is assumed that the I/O device resource mappings (I/O and IRQx) are no longer deterministic or visible to the power management software at system boot-up time. Current and future generations of operating systems will be based on plug-and-play architectures, where the I/O resource mapping can and will change dynamically during the lifetime of the current system boot. When these dynamic remappings of I/O devices do occur, there is currently no easy way to communicate to the power management hardware and software.

Also, the existing software power-management techniques assume that the applications of the associated device drivers in the system are APM and PMC aware. This makes it difficult to manage a system with applications and drivers which are not power aware.

SUMMARY OF THE INVENTION

A power management mechanism for use in a computer system is described. The computer system comprises a bus, a memory for storing data and instructions, and a central processing unit (CPU). The CPU runs an operating system having a power management virtual, device driver (PMV×D) responsible for performing idle detection for devices. The PMV×D performs idle detection using event timers that provide an indicator as to the activity level. The PMV×D places idle local devices in a reduced power consumption state when no activity has occurred for a predetermined period of time.

BRIEF DESCRIPTION OF THE DRAWINGS

The present invention will be understood more fully from the detailed description given below and from the accompanying drawings of various embodiments of the invention, which, however, should not be taken to limit the invention to the specific embodiments, but are for explanation and understanding only.

DETAILED DESCRIPTION OF THE PRESENT INVENTION

Figure 1:
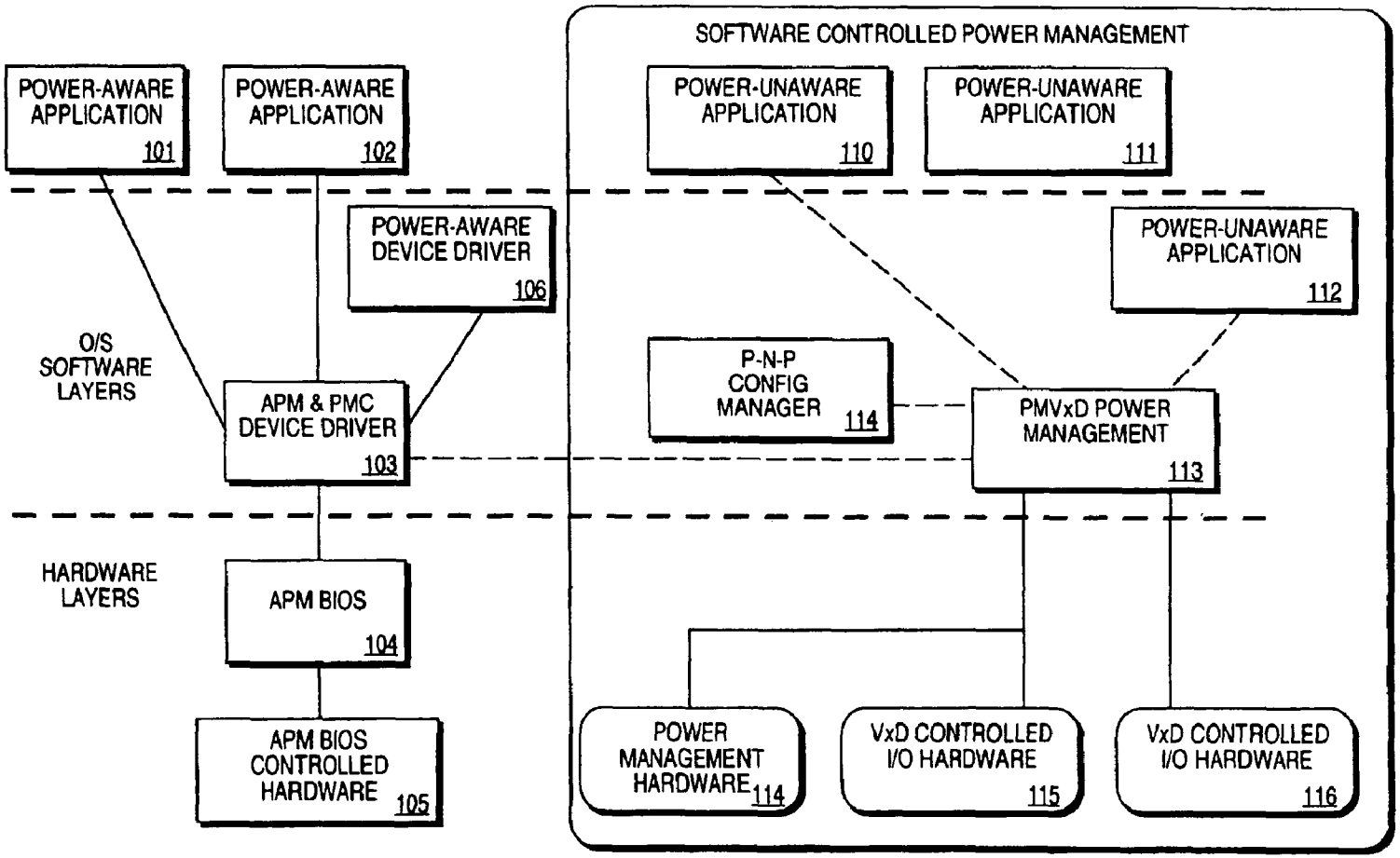
FIG. 1 illustrates one embodiment of the power management architecture of the present invention.

A method and apparatus for reducing power consumption in a computer system is described. In the following detailed description of the present invention numerous specific details are set forth, such as types of I/O devices, idle time periods, interrupt types, power management states, etc., in order to provide a thorough understanding of the present invention. However, it will be appreciated by one skilled in the art that the present invention may be practiced without these specific details. In other instances, well-known structures and devices are shown in block diagram form, rather than in detail, in order to avoid obscuring the present invention.

Some portions of the detailed description which follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to apparatus for performing the operations herein. This apparatus may be specially constructed for the required purposes, or it may comprise a general purpose computer selectively activated or reconfigured by a computer program stored in the computer. The algorithms and displays presented herein are not inherently related to any particular computer or other apparatus. Various general purpose machines may be used with programs in accordance with the teachings herein, or it may prove convenient to construct more specialized apparatus to perform the required method steps. The required structure for a variety of these machines will appear from the description below. In addition, the present invention is not described with reference to any particular programming language. It will be appreciated that a variety of programming languages may be used to implement the teachings of the invention as described herein.

Overview of the Present Invention

The present invention provides for power management in a computer system using virtual device drivers (V×Ds). In one embodiment, the V×Ds of the present invention are provided in the Windows™ operating system manufactured by Microsoft® Corporation of Redmond, Wash. The present invention provides a power management V×D that controls at least a portion of the power management in the computer system. Power management in the present invention is facilitated by the I/O/interrupt/V×D trapping capabilities of the V×Ds running in the protected mode of the CPU at the highest privileged level of the operating system in an operating system co-operative manner. The V×D operates at the CPU's highest privileged level (ring 0). Therefore, the V×D of the present invention has access and control over system hardware and software components. This enables it to operate and respond to power management events much faster, with low task switching overheads. In one embodiment, not only does the V×D interface to other software (e.g., applications), but it also provides an API interface to both real/protected mode programs.

The present invention allows software to power-manage a system with applications and device drivers which are not power-aware. In addition, software operates cooperatively with the existing power-management software infrastructure such as, for instance, Advanced Power Management specification (APM 1.1), Power Management Coordinator (PMC), etc.

The Windows Environment

The Microsoft® Windows operating environment provides a graphical user interface (GUI) which makes Windows application programs easier to use. Microsoft® Windows environment runs Windows applications located in the extended area of memory above the 1 megabyte boundary using the protected mode of a processor, such as an Intel Architecture Microprocessor, manufactured by Intel Corporation of Santa Clara, Calif., the corporate assignee of the present invention.

The Microsoft® Windows 3.1 system can operate in one of two modes: "standard" mode and "enhanced" mode. The standard mode exists so that personal computers equipped with older 80286 processors can use the Windows environment. The enhanced mode of Microsoft® Windows is used when Microsoft® Windows is run on a computer system which uses an 80386 microprocessor or more recently available microprocessors such as, for instance, the i486™ processor.

The enhanced mode of Microsoft® Windows operates in the protected mode of the Intel Architecture Microprocessors (e.g., i386™ processor, i486™ processor, etc.). In this manner, the enhanced mode of Microsoft® Windows takes advantage of features in the Intel Architecture Microprocessors to offer virtual memory and multitasking operation. The processor hardware supports execution of several Windows applications in protected mode.

The enhanced mode of Microsoft® Windows supports DOS applications using "DOS virtual machines." In a DOS Virtual Machine, the Intel Architecture Microprocessor operates in Virtual 8086 mode and uses the virtual memory feature to provide DOS, device drivers, and Terminate and Stay Resident (TSR) programs originally loaded into the computer to a DOS virtual machine in extended memory. Windows uses the virtual memory system to make the application area and the DOS, device drivers, and TSR programs appear to be a single contiguous block of real mode memory. When the microprocessor is operating in Virtual 8086 mode within the address area of DOS virtual machine, the Virtual 8086 mode microprocessor in unaware of any memory outside of the DOS virtual machine.

Figure 6:
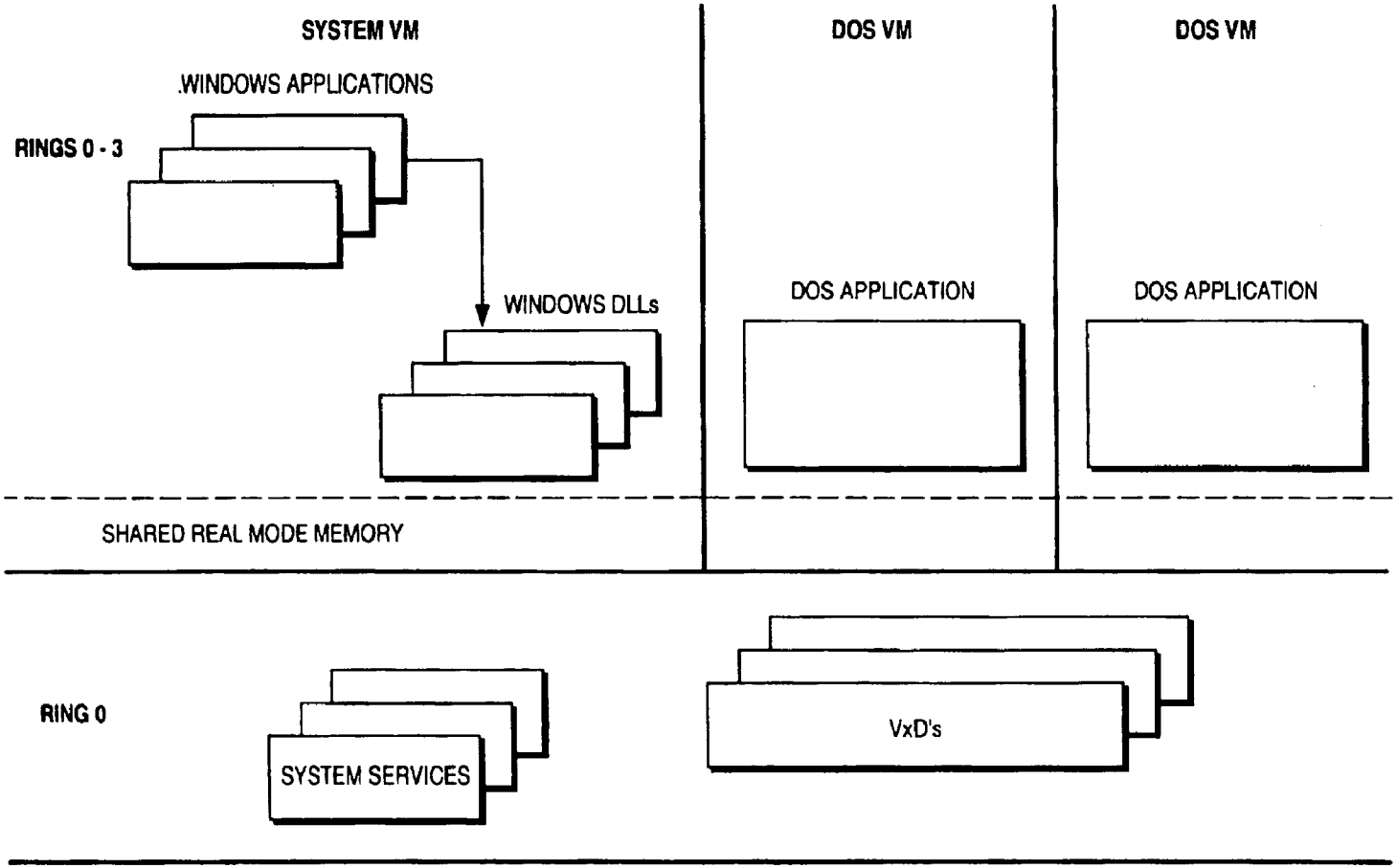
FIG. 6 a conceptual diagram of the Windows operating system in enhanced mode.

FIG. 6 provides a conceptual diagram of the Windows system in enhanced mode. Referring to FIG. 6, the computer system hardware is represented as a level. The Ring 0 level with the Kernel and virtual device drivers (V×Ds) is also shown, along with the system virtual machine and the various DOS virtual machines. Windows creates DOS virtual machines by mapping DOS, device drivers, and TSR programs in the system VM into the DOS VMs. Therefore, all the virtual machines share a region of memory called the shared real mode memory.

The Virtual device drivers (V×Ds) at ring 0 are a special feature of Microsoft® Windows enhanced mode. A virtual device driver is actually a routine which manages a system resource such that more than one application can use the system resource at a time. Virtual device drivers therefore support Windows' ability to act as a multitasking operating system. The virtual device drivers, including the V×D of the present invention, have access to a wide range of kernel services, including those for hardware management, memory management, task scheduling, and communicating with other virtual devices.

As illustrated in FIG. 6, all the Windows applications run within the system virtual machine which operates in protected mode. The Windows Dynamic Link Libraries (DLLs) which support Windows applications also run within the system virtual machine.

Each DOS application in FIG. 6 runs within its own DOS virtual machine. Since the DOS virtual machines usually operate in the Virtual 8086 mode of the microprocessor, the DOS applications generally only address the 1 Megabyte of memory in the DOS virtual machine.

Power Management Architecture

The power management architecture of the present invention is shown in FIG. 1. Referring to FIG. 1, various power-aware applications (101, 102) shown make use of an APM/PMC device driver 103 at the operating system software layer. A power-aware device driver 106 also makes use of APM/PMC device driver 103 at the operating system software layer. The APM BIOS (Basic Input/Output System) hardware 104 controls the APM/PMC device driver 103. The APM BIOS 104 also controls hardware 105.

Also shown in FIG. 1, power-unaware applications 110–112 communicate with PMV×D power management software 113. The PMV×D power management software 113 communicates with a Plug-n-Play (P-n-P) configuration manager 114 and the APM/PMC device driver 103 in the operating system software layer. The PMV×D power management software 113 controls hardware. The PMV×D power management software 113 controls the V×D controlled hardware 115 and 116 as well as the power management hardware 117 at the hardware layer. In one embodiment, the V×D controlled hardware 115 and 116 have built-in power management capabilities in the form of a switch and only needs some type of signal to enable them. In one embodiment, the power management hardware 117 may include hardware necessary for placing certain I/O devices in a reduced power consumption state.

The present invention provides for placing a computer system in various power management states, or modes of operation, using a virtual device driver (V×D) that has I/O, device driver and interrupt trapping capabilities. In one embodiment, the V×D provides support for four power management modes: fully-on, local standby, global standby and hibernation. The PMV×D of the present invention also provides support for clock throttling. The present invention may support, only one or more of these modes. Furthermore, the use of the clock throttling mode depends on whether the processor in a computer system includes the required functionality to provide such a feature (i.e., repeatedly issuing a HALT command to the CPU). One embodiment of the power management states of the present invention are illustrated in the state diagram in FIG. 2.

Figure 2:
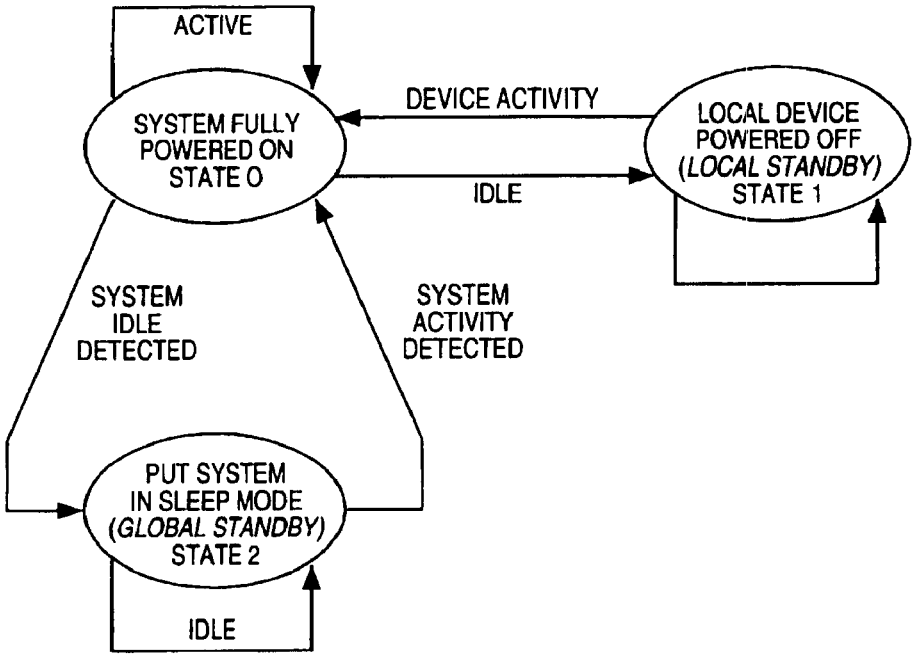
FIG. 2 illustrates one embodiment of the power management states of the present invention.

Referring to FIG. 2, state 1 is the fully powered-on state. While the system is active, the computer system remains in the fully powered-on state. Whether the system is active is based on device activity of local devices as well as system activity (e.g., keyboard stroke, mouse movement, etc.) Once one or more local devices are determined to be idle, the computer system transitions to state 2 where each idle local device is powered off, such that the computer system enters the local standby state with respect to those powered down devices. The computer system remains in local standby while a local device is idle. As soon as the local device is no longer idle, the computer system transitions back to the fully powered on state. When the computer system determines that the entire system is idle (e.g., all the local devices are idle), the computer system transitions to state 2 to enter global standby. In global standby, the system is placed in sleep mode, where it remains until system activity is detected. At that time, the computer system returns to the fully powered on state (0).

In another embodiment, the system transitions from the local standby state directly to the global standby state. That is, the computer system does not reenter the fully powered on state before entering global standby.

The Power Management Virtual Device Driver (PMV×D)

The present invention comprises a power management virtual device driver (PMV×D) and a set of data structures. The data structures are initialized at system boot-up time to provide command/status information to the PMV×D. The PMV×D controls power management and comprises several software idle timers, one for each enabled I/O device. The idleness of a particular device is detected by monitoring the activity of each of the enabled I/O devices. The monitoring of the enabled I/O devices may be performed by one of the following: I/O port address trapping, chaining into I/O device interrupt handlers, trapping on I/O devices driver (V×D) accesses, and chaining into I/O protection fault handler, each of which is well-known in the art.

Most of these capabilities are provided to the V×D as a set of VMM and V×D service calls, which are standard Windows™ device driver support.

The PMV×D is chained into the system timer interrupt, which provides the time base for all PMV×D counters. In one embodiment, the PMV×D uses the occurrence of the IRQ0 to indicate when to monitor the activity of each I/O device and also the overall system activity for local and global standby modes. In one embodiment, the IRQ0 occurs every 55 ms. Thus, in this embodiment, a power management manager of the PMV×D checks every 55 ms to determine whether the local devices have been or are active and whether the system as a whole has been or is active. If a device has been inactive for a predetermined period of time, the power management manager of the PMV×D controls the powering down of the device. The predetermined period of time may be of variable length and is set based on the desired power savings. Different periods of time may be associated with different devices.

The PMV×D installs handlers for I/O trapping to the I/O port of each device. Anytime an I/O port access is trapped, a corresponding counter is updated (increment/decrement) to reflect the activity status. For I/O devices whose I/O addresses are virtualized, PMV×D interrupt handler stubs (e.g., small pieces of code stored in memory at all times) can be chained into the original interrupt handlers for each specific I/O device. This PMV×D stub handler maintains the idleness of an I/O device, for example, Floppy Disk interrupt OEh. The use and operation of a stub handler is well-known in the art.

Figure 3:
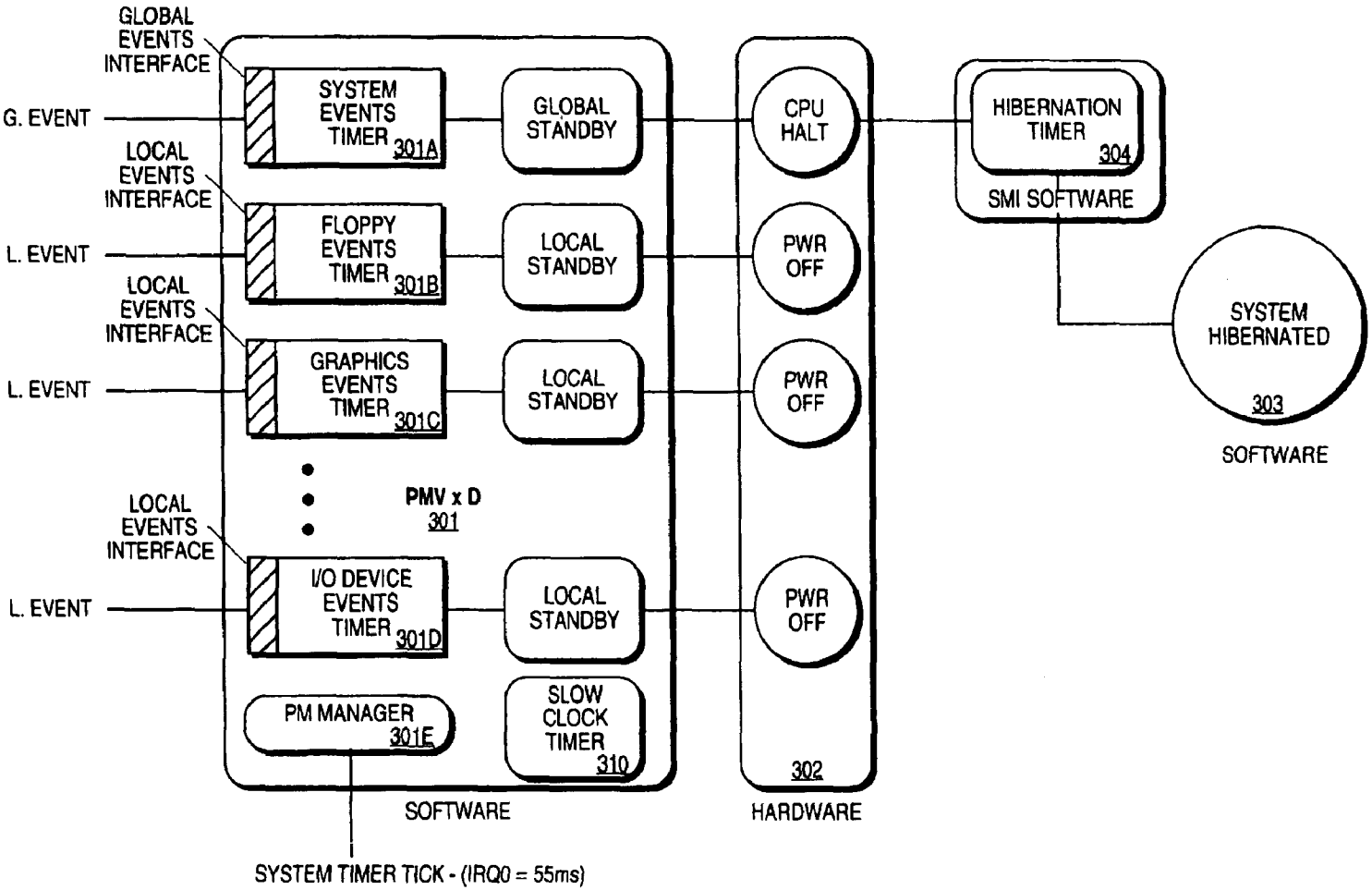
FIG. 3 illustrates an embodiment of the power management control of the present invention.

FIG. 3 illustrates the power management control overview. Referring to FIG. 3, the PMV×D 301 is shown controlling hardware 302. Software 303 also controls hardware 302 and places hardware 302 in hibernation mode in cooperation with hibernation timer 304. The PMV×D 301 comprises software timers, including a system events timer 301A and multiple local events timers, such as a floppy events timer 301B, graphics events timer 301C and I/O device timer 301D. Each of the local events timers (e.g., 301B–D) monitor local events via an I/O trap handler, a device driver hook handler or a chained-interrupt trap handler as an interface. This interface increments and decrements the software timers. The system events timer 301A monitors global events via an interface, which may also be either an I/O trap handler, a device driver hook handler or a chained-interrupt trap handler. Note that in one embodiment only one of these is employed for each global or local events timer.

At a regular interval, such as at every 55 ms corresponding to the occurrence of the IRQ0, the power management (PM) manager 301E checks the status of each of the events timers (e.g., 301A–D). When an events timer times-out, the PMV×D may turn off the power to the I/O device. That is, PM manager 301E causes a handler for that event timer to be called. This handler controls the dedicated hardware in hardware 302 for removing power to the I/O device. When activity is detected, PM manager 301E calls the handler again to power up the device. Similarly if the system events timer times out, PM manager 103E calls the global standby handler associated with the system events timer, which when run causes the clock to the CPU to be stopped in a manner well-known in the art, such that the CPU is halted.

When the CPU has been halted, the hibernation timer 304 is started. If the hibernation timer times out, an interrupt occurs, such as a system management interrupt (SMI) in one embodiment. Software 303 for the interrupt places the system in a hibernated state. In response to a system event such as, for instance, a keyboard input or cursor control device movement, the computer system exits the hibernation state and the global standby state.

PMV×D 301 also includes a slow clock timer 310 for use with the clock throttling mode. The slow clock timer 310 is described below.

With respect to Plug-and-Play Compliance, the PMV×D is part of the O/S and appears as a device driver in the system. In a Plug-and-play environment, when the system resources are remapped to the I/O devices, the PMV×D is informed of the changes by the O/S specific configuration manager or resource manager. This well-defined interface mechanism between the O/S and PMV×D allows it to dynamically adapt itself to the changes gracefully. The present invention provides such capability by having the PMV×D register with the configuration manager (CM) and instructs the configuration manager to notify it when there has been a configuration change. The PMV×D responds to the notification in the same manner as when examining the data structures at system boot-up time.

Dynamic Clock Throttling

Figure 4:
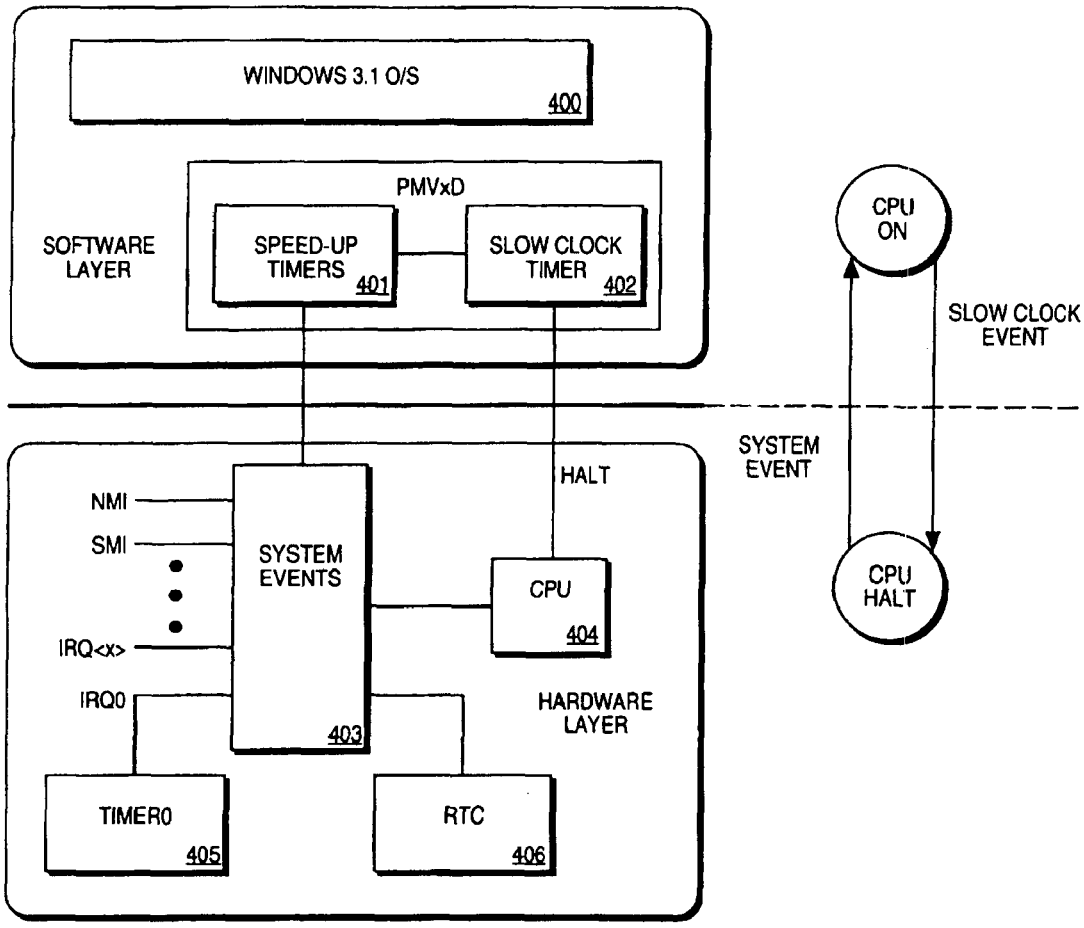
FIG. 4 illustrates one embodiment of the dynamic clock throttling mechanism of the present invention.
Figure 5:
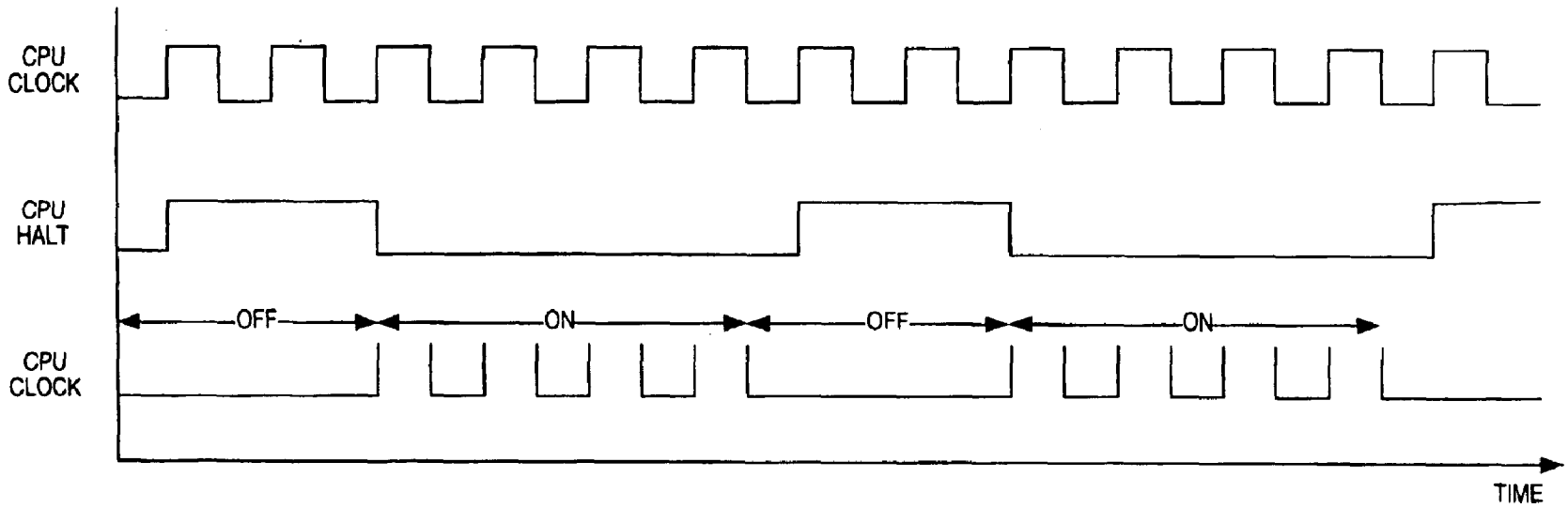
FIG. 5 illustrates a timing diagram of the CPU clock throttling.

FIG. 4 illustrates the dynamic clock throttling mechanism of the present invention. Referring to FIG. 4, dynamic clock throttling is accomplished by the PMV×D operating in the Windows 3.1 O/S 400 with support from the standard PC hardware. Periodic assertion of CPU HALT to CPU 404 by the slow clock timer 402 emulates a slower clock timer event. CPU 404 being responsive to the HALT command causes a reduction in power consumption. FIG. 5 illustrates a timing diagram of the CPU clock throttling. Using speed up timers 401, the slow clock timer 402 is de-asserted by a variable and periodic interrupt event from the system timer 405 or real-time clock (RTC) 406.

Data Structures of the PMV×D

The following tables indicate one embodiment of the data structures of a PMV×D according to the teachings of the present invention. These data structures have a one-to-one correspondence to the programmable hardware power management features of the i486SL SuperSet. In one embodiment, a graphical user interface (GUI) permits changes to be made to default values as per the needs of an end user. Tables 1 and 2 below illustrates the PMV×D initialization data structures of local devices.

TABLE 1

| Struct Local_Device | Struct Local_DEvents | Struct Local_DStatus |
|---|---|---|
| { | { | { |
| IntFloppyEn/Di; | IntFloppy IO/Intr/VxD; | IntFloppy On/Off; |
| Int Harddisk En/Di; | Int Harddisk IO/Intr/VxD; | Int Harddisk On/Off; |
| IntGraphics En/Di; | Int Graphics IO/Intr/VxD; | Out Graphics On/Off; |
| IntEthernet En/Di; | IntEthernet IO/Intr/VxD; | IntEthernet On/Off; |
| IntCOM1 En/Di; | IntCOM1 IO/Intr/VxD; | IntCOM1 On/Off; |
| IntCOM2 En/Di; | IntCOM2 IO/Intr/VxD; | IntCOM2 On/Off; |
| IntLPT En/Di; | IntLPT IO/Intr/VxD; | IntLPT On/Off; |
| Int Keyboard En/Di; | Int Keyboard IO/Intr/VxD; | Int Keyboard On/Off; |
| IntCPU En/Di; | IntCPU IO/Intr/VxD; | IntCPU On/Off; |
| Int Misc En/Di; | Int Misc IO/Intr/VxD | |
| } | } | } |
| Note: Indicates that Local Device Monitoring is Enabled or Disabled | Note Indicates the Local Device Events that are Monitored | Note: Indicates the Local Device Power On/Off Status |

TABLE 2

| Struct Local_Activity | Struct Local_Dint.Num | Struct Local_D.I.O.Range |
|---|---|---|
| { | { | { |
| IntFloppy Yes/No; | IntFloppy Num; | IntFloppy IO Range; |
| IntHarddisk Yes/No; | IntHarddisk Num; | IntHarddisk IO Range; |
| IntGraphics Yes/No; | IntGraphics Num; | IntGraphics IO Range; |
| IntEthernet Yes/No; | IntEthernet Num; | IntEthernet IO Range; |
| IntCOM1 Yes/No; | Int COM1 num; | IntCOM IO Range; |
| IntCom2 Yes/No; | IntCOM2 Num; | IntCOM2 IO Range; |
| Int LPT Yes/No; | Int LPT Num; | Int LPY IO Range; |
| Int Keyboard Yes/No; | Int Keyboard Num; | Int Keyboard IO Range; |
| Int CPU Yes/No; | Int CPU NUM; | Int CPU IO Range; |
| Int Misc Yes/No; | Int Misc Num; | Int Misc IO Range; |
| } | } | } |
| Note: Indicates that Local Device is Active/Inactive since last sampling by PM manager | Note Indicates the Local Device Interrupt Number to be monitored as Event | Note: Indicates the Local Device IO Range as 16-bit Start/End Addr. Pair |

Table 3 below illustrates the PMV×D initialization data structures for global events.

TABLE 3

| StructGlobal_Sys.Events | StructSyr_BreakEvents | StructSuspend_Status |
|---|---|---|
| { | { | { |
| IntAPM_Msg. En/Di; | IntAPM_Msg. En/Di; | IntLocal_Standby On/Off; |
| IntNMI En/Di; | IntNMI En/Di; | IntGlobal-Standby On/Off; |
| IntRING En/Di; | IntRING En/Di; | IntFully_On On/Off; |
| IntRQ<0.15> En/Di; | IntRQ<0.15> En/Di; | IntHibernation On/Off; |
| Int Misc En/Di; | Int Misc En/Di; | Int Misc On/Off; |
| } | } | } |

TABLE 3-continued

| StructGlobal_Sys.Events | StructSyr_BreakEvents | StructSuspend_Status |
|---|---|---|
| Note: Indicates that System Events Monitoring is Enabled or Disabled | Note: Indicates that System Events Enable as Break Events | Note Indicates the System Power Miser Mode Status |

In one embodiment, a user interface for programming the power management features is available at an end-user level. Such an interface enables the user to specify data for the data structures shown above. Note that in one embodiment, this may be invisible to the user.

In one embodiment, hardware is manipulated directly, for example, when the V×D and VMM service calls provided by Windows are limited. For instance, in one embodiment, it may be necessary to disable the system timer interrupt during Standby mode.

In one embodiment, in order to trap I/O address :ranges which are virtualized by other V×Ds, interrupt chaining or use of a device driver hook handler is required.

Power Managed Hardware and An Exemplary Computer System

The various components of a system that may be power managed include, but are not limited to, the CPU, generic I/O controllers (e.g., graphics, floppy, hard disk, keyboard, etc.), serial and parallel interfaces and their associated devices (e.g., modem, mouse, trackball, trackpad, printers, LAN), LAN interfaces, and DRAM memory systems. An exemplary computer system is described in FIG. 7 below.

Figure 7:
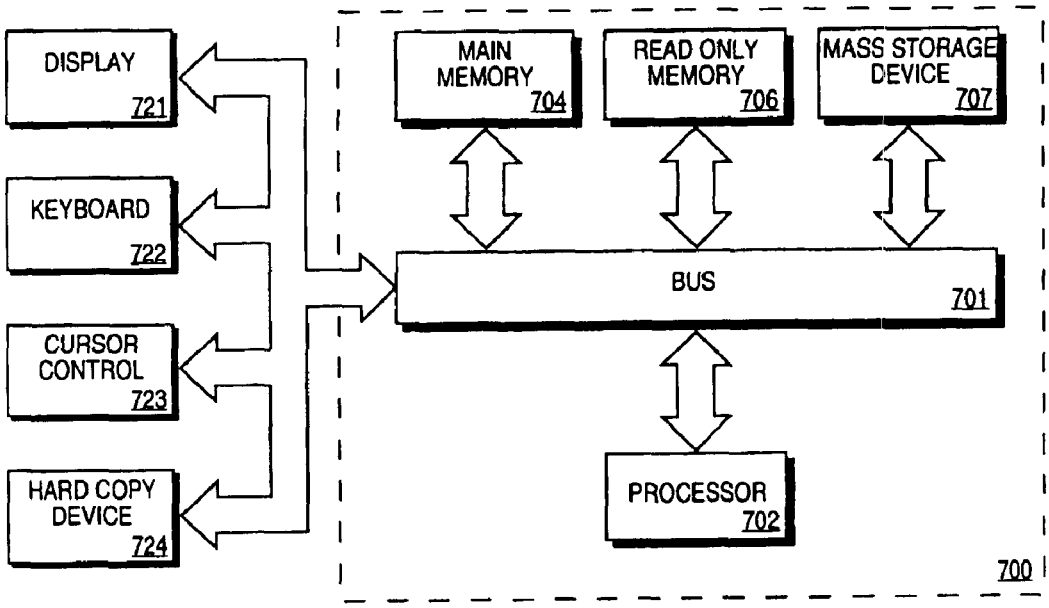
FIG. 7 is a block digram of one embodiment of the computer system of the present invention.

Referring to FIG. 7, one embodiment of the computer system of the present invention is implemented is shown as 700. Computer system 700 comprises a bus or other communication means 701 for communicating information, and a processor 702 coupled with bus 701 for processing information. Processor 702 includes, but is not limited to microprocessors such as the Intel™ Architecture Microprocessor, manufactured by Intel Corporation of Santa Clara, Calif., the corporate assignee of the present invention, PowerPC™, Alpha™, etc.

System 700 further comprises a random access memory (RAM) or other dynamic storage device 704 (referred to as main memory), coupled to bus 701 for storing information and instructions to be executed by processor 702. Main memory 704 also may be used for storing temporary variables or other intermediate information during execution of instructions by processor 702. Computer system 700 also comprises a read only memory (ROM) and/or other static storage device 706 coupled to bus 101 for storing static information and instructions for processor 702, and a data storage device 707 such as a magnetic disk or optical disk and its corresponding disk drive. Data storage device 707 is coupled to bus 701 for storing information and instructions.

Computer system 700 may further be coupled to a display device 721, such as a cathode ray tube (CRT) or liquid crystal display (LCD) coupled to bus 701 for displaying information to a computer user. An alphanumeric input device 722, including alphanumeric and other keys, may also be coupled to bus 701 for communicating information and command selections to processor 702. An additional user input device is cursor control 723, such as a mouse, a trackball, stylus, or cursor direction keys, coupled to bus 701 for communicating direction information and command selections to processor 702, and for controlling cursor movement on display 721. Another device which may be coupled to bus 701 is hard copy device 724 which may be used for printing instructions, data, or other information on a medium such as paper, film, or similar types of media. Furthermore, a sound recording and playback device, such as a speaker and microphone may optionally be coupled to bus 701 for interfacing with computer system 700.

Note that any or all of the components of system 700 and associated hardware may be used, however, it can be appreciated that any type of configuration of the system may be used for various purposes as the user requires.

The PMV×D of the present invention requires none or very minimal hardware support to achieve comparable or better level of power conservation, relative to the prior art dedicated hardware (SMM) power management techniques discussed above.

The present invention provides power management using less hardware. Because less hardware is required, there is less power consumption. Thus, the power management provided by the present invention is a power saver.

As opposed to the prior art, the present invention allows more room for expansion without any hardware penalty. Also the I/O devices used in the present invention are not required to use standard I/O addresses over the life of the system.

The power management mechanism of the present invention is closely coupled to the operating system, such that each is aware of the other's actions. This allows the present invention to avoid system crashes (e.g., when the power management software interrupts and takes control from the operating system when it is executing a critical section of code). In other words, the PMV×D of the present invention eliminates system crash problems by eliminating blind spots. Also, the close coupling allows the PMV×D to be aware of dynamic changes in the I/O device state changes. Furthermore, the present invention does not have to virtualize I/O ports. There is no difficulty for the PMV×D to detect it as such. Thus, the present invention prevents monitoring and trapping on invalid I/O device addresses and the generation of improper events in the system.

When I/O device addresses do change dynamically during the life time of the current system boot, the present invention provides an easy environment in which to update and reorganize it by simply modifying the data structures and their I/O address ranges.

Moreover, the present invention operates with existing software power management techniques (e.g., APM 1.1 spec.) that assumes that applications and the associated device drivers in the system be APM-aware to monitor and control power management. Thus, the PMV×D of the present invention power manages a system which has traditional applications and device drivers, one of which is not power-aware. The PMV×D makes the non-power-aware Windows applications and device drivers "virtually power aware".

The present invention may be extended to operating systems like IBM OS/2, Microsoft® Windows NT, Unix, etc.

Although the above description focused on notebook computer system power management, the present invention may be applied to desktop and home computer systems as well. Alternatively, the present invention may be used to power manage PCMCIA hardware and for thermal control of future generation CPU's.

Note that for Real Mode DOS or Standard Mode Windows environments, it may be appropriate to use POWER.EXE for real mode power management.

Thus, a method and apparatus for reducing power consumption in a computer system using virtual device drivers has been described.

I claim:

1. A computer system comprising:

a bus;

at least one memory coupled to the bus for storing data, including an operating system; and a central processing unit (CPU) coupled to the bus running the operating system with a virtual device driver (V×D), wherein the virtual device driver performs device idle detection using one or more events timers indicating the activity level of at least one local device, and further wherein the virtual device driver places idle local devices in a reduced power consumption state when associated events timers indicate that no activity has occurred for a predetermined period of time.

2. The computer system defined in claim 1 wherein the virtual device driver performs system idle detection.

3. The computer system defined in claim 1 wherein the virtual device driver comprises I/O trapping capabilities to perform idle detection.

4. The computer system defined in claim 1 wherein the virtual device driver comprises a V×D trap handler to perform idle detection.

5. The computer system defined in claim 1 wherein the virtual device driver comprises a chained-interrupt trap [handier] *handler* to perform idle detection.

6. The computer system defined in claim 1 wherein the memory stores data structures indicating enabled local devices being monitored by the device driver.

7. The computer system defined in claim 1 wherein the memory stores data structures indicating events being monitored by the device driver.

8. The computer system defined in claim 1 wherein the memory stores data structures indicating I/O address ranges for local devices.

9. The computer system defined in claim 1 wherein the memory stores data structures indicating activity level of local devices to the device driver.

10. The computer system defined in claim 1 wherein the memory stores data structures indicating power management states into which the device driver may place the computer system.

11. A computer system comprising:

a bus;

a central processing unit (CPU) coupled to the bus running an operating system and at least one power-unaware application, wherein the operating system has a virtual device driver performing device idle detection using one or more events timers indicating the activity level of at least one local device, and further wherein the virtual device driver places idle local devices in a reduced power consumption state when associated events timers indicate that no activity has occurred for a predetermined period of time transparent to said at least one power-unaware application.

12. The computer system defined in claim 11 wherein the virtual device driver performs system idle detection.

13. The computer system defined in claim 11 wherein the virtual device driver comprises I/O trapping capabilities to perform idle detection.

14. The computer system defined in claim 11 wherein the virtual device driver comprises a V×D trap handler to perform idle detection.

15. The computer system defined in claim 11 wherein the virtual device driver comprises a chained-interrupt trap handler to perform idle detection.

16. The computer system defined in claim 11 wherein the memory stores data structures indicating enabled local devices being monitored by the virtual device driver.

17. The computer system defined in claim 11 wherein the memory stores data structures indicating events being monitored by the virtual device driver.

18. The computer system defined in claim 11 wherein the memory stores data structures indicating I/O address ranges for local devices.

19. The computer system defined in claim 11 wherein the memory stores data structures indicating activity level of local devices to the virtual device driver.

20. The computer system defined in claim 11 wherein the memory stores data structures indicating power management states into which the virtual device driver may place the computer system.

21. A computer system comprising:

at least one bus;

a memory coupled to said at least one bus;

a device coupled to said at least one bus;

a processor coupled to said at least one bus, wherein the processor is configured to execute a virtual device driver to control placement of said device into a reduced power consumption state.

22. The computer system defined in claim 21 wherein the virtual device driver performs idle detection for the device.

23. The computer system defined in claim 21 wherein the virtual device driver performs idle detection for the device using at least one event timer indicating the activity level of the device.

24. The computer system defined in claim 23 wherein the virtual device driver places the device in a reduced power consumption state when said at least one events timer indicates that no activity has occurred for a predetermined period of time.

25. The computer system defined in claim 21 wherein the processor runs at least one power-unaware application and the virtual device driver places the device in the reduced power consumption state transparent to said at least one power-unaware application.

26. The computer system defined in claim 21 wherein the memory stores data structures indicating enabled local devices being monitored by the virtual device driver, events being monitored by the virtual device driver, I/O address ranges for local devices, and activity level of local devices to the virtual device driver.

27. The computer system defined in claim 21 wherein the virtual device driver comprises a V×D trap handler to perform idle detection.

28. The computer system defined in claim 21 wherein the device comprises an I/O device.

29. A method for controlling an input/output (I/O) device, said method comprising the steps of:

executing a virtual device driver;

monitoring activity of the I/O device;

detecting the I/O device being inactive for a predetermined period of time; and the virtual device driver placing the I/O device in a reduced power consumption state in response to the I/O device being detected as inactive.

30. The method defined in claim 29 further comprising the step of initializing, at boot-up time, a plurality of data structures associated with the virtual device driver.

31. The method defined in claim 29 wherein the step of monitoring comprises the virtual device driver monitoring activity of the I/O device at the occurrence of a system timer interrupt.

32. The method defined in claim 29 further comprising the step of varying the predetermiend period of time.

33. The method defined in claim 32 wherein the predetermined period of time is varied based on desired power savings.

34. The method defined in claim 29 further comprising the step of the virtual device driver adjusting an events timer according to activity of the device.

35. The method defined in claim 29 further comprising the steps of:

a configuration manager notifying the virtual device driver of system resources being remapped; and the virtual device driver examining its data structures to adapt itself to the remapped system resources.

*36. An article comprising:*

*a machine readable storage medium storing instructions comprising a device manager and power management software, said power management software, if executed by a system, performs operations comprising said power management software:*

*cooperates with said device manager to allow power management of a plurality of devices in the system which are configurable devices; and*

*manages a power level for each of the plurality of devices in the system and is capable of placing one or more of said plurality of devices in a reduced power consumption state.*

*37. The article of claim 36 wherein said power management software operates at a kernel level of an operating system.*

*38. The article of claim 37 wherein said device manager comprises a plug and play manager.*

*39. The article of claim 38 wherein said power management software comprises a power manager that forms a part of a kernel of the operating system.*

*40. The article of claim 38 wherein said power management software, if executed, communicates with said plug and play manager to update data structures if configuration changes occur to allow power management of dynamically reconfigurable devices.*

*41. The article of claim 40 wherein said power management software, if executed, places the system in a sleep state when the system is idle and keeps said system in said sleep state until activity is detected, and wherein the sleep state is one of a plurality of system power management states, and further wherein said system stops a clock for a system processor in said sleep state.*

*42. The article of claim 38 wherein said operating system, if executed, provides virtual memory organization and multitasking operation.*

*43. The article of claim 38 wherein said plurality of devices comprise:*

*an I/O device that is placed in a first reduced power consumption state by the power management software if the I/O device is inactive for a first period of time; and*

*a processor that is placed in a second reduced power consumption state by the power management software if the system is idle for a second period of time.*

*44. The article of claim 36 wherein said power management software, if executed, registers with said device manager to be notified of configuration changes.*

*45. The article of claim 36 wherein said power management software comprises a power manager, said power manager, if executed, providing system level power management including the use of multiple system level power management states for said system, and providing multiple power management states for said plurality of devices.*

*46. The article of claim 36 wherein said power management software, if executed, provides support for idle detection for at least one of said plurality of devices.*

*47. The article of claim 36 wherein said power management software performs power management for said plurality of devices and lacks a permanent tie to a specific hardware device in the system.*

*48. An article comprising:*

*a machine readable storage medium storing power management software which, if executed by a system, performs operations comprising said power management software:*

*coordinates power management for a plurality of devices; and*

*registers with a configuration manager to be notified of configuration changes for any of said plurality of devices.*

*49. The article of claim 48 wherein said power management software comprises a device driver that manages a power state for said plurality of devices.*

*50. The article of claim 49 wherein said device driver, if executed, in response to a configuration change, examines its data structures to adapt to remapped system resources.*

*51. The article of claim 49 wherein said configuration manager is a plug and play manager.*

*52. The article of claim 48 wherein said power management software, if executed, alters data in a data structure in response to a configuration change to allow continued power management of said plurality of devices after said configuration change.*

*53. The article of claim 52 wherein said power management software, if executed, instructs the configuration manager to notify it when there has been the configuration change and wherein said power management software responds to a notification of the configuration change by updating data in said data structure in the same manner as when examining the data structure at system boot-up time.*

*54. An article comprising:*

*a computer readable storage medium storing power management software comprising a power manager and additional software which is operating system software, the power management software, if executed by a computer, performs operations comprising said power management software:*

*forms a part of a kernel level of an operating system for the computer;*

*cooperates with a device manager to allow power management of a plurality of system devices after reconfiguration of said plurality of system devices; and*

*manages a power level of the computer.*

*55. The article of claim 54 wherein said power management software, if executed by said computer, provides support for idle detection for at least one of a plurality of devices.*

*56. The article of claim 55 wherein said power management software provides support for clock throttling of a system processor.*

*57. An article comprising:*

*a computer readable medium storing a plurality of computer executable instructions including power management software and additional software to implement an operating system, the power management software, if executed by a computer system, operates in an operating system cooperative manner with said operating system at a kernel level which is a highest privilege level of the operating system, and causes the computer system to perform operations comprising:*

*providing support for device idle detection for an input/output device in said computer system to determine when said input/output device has been inactive for a first duration, the first duration being a user configurable duration that may be varied based on desired power savings using a graphical user interface;*

*placing said input/output device in a reduced power consumption state if said input/output device has been inactive for the first duration;*

*cooperating with a plug and play manager that, in cooperation with said power management software, allows power management of said input/output device even though said input/output device is a plug and play configurable device;*

*providing support for system level power management by monitoring global events;*

*placing said computer system into one of a plurality of system level power management states as a part of system level power management implemented by said power management software, one of said plurality of system level power management states being a sleep state into which the computer system is placed due to the system remaining idle.*

*58. A method comprising:*

*monitoring, using power management software, a power level of a plurality of devices in a system;*

*detecting an inactive device;*

*placing one of said plurality of devices in a reduced power consumption state due to detected inactivity;*

*performing system level power management using said power management software; and*

*allowing continued power management of devices after device reconfiguration.*

*59. The method of claim 58 wherein allowing comprises communicating with a device manager to update data structures if configuration changes occur.*

*60. The method of claim 59 wherein the device manager comprises a plug and play manager.*

*61. The method of claim 58 further comprising:*

*programming a first duration of inactivity required to place one of said plurality of devices in said reduced power consumption state based on desired power savings.*

*62. The method of claim 58 wherein performing system level power management comprises:*

*placing said system in a sleep mode that stops a clock to a system processor until system activity is detected.*

*63. The method of claim 58 wherein said power management software operates at a kernel level of an operating system for the system and wherein said power management software cooperates with operating system routines in performing system power management.*

*64. A method comprising:*

*coordinating power management for a plurality of devices;*

*registering with a configuration manager to be notified of configuration changes for any of said plurality of devices.*

*65. The method of claim 64 wherein power management software for said plurality of devices controls a power state for said plurality of devices and performs coordinating power management for said plurality of devices and registering with the configuration manager to be notified of configuration changes for any of said plurality of devices.*

*66. The method of claim 65 further comprising:*

*instructing the configuration manager to notify the device driver when there has been a configuration change; and*

*responding to notification by updating data in a data structure in the same manner as when examining the data structure at system boot-up time.*

*67. The method of claim 65 wherein said power management software operates at a kernel level of an operating system and wherein said power management software cooperates with operating system routines in performing power management.*

*68. The method of claim 64 wherein said configuration manager is a plug and play manager.*

*69. The method of claim 64 further comprising:*

*altering data in a data structure in response to a configuration change to allow continued power management of said plurality of devices after a configuration change.*

*70. A system comprising:*

*a bus;*

*a plurality of devices coupled to said bus, the plurality of devices being configurable devices, the system being capable of reconfiguring said plurality of devices;*

*a memory containing a device manager and power management software which, if executed by the system, cooperates with said device manager to allow power management of said plurality of devices in the system and manages a power level of said plurality of devices.*

*71. The system of claim 70 wherein the plurality of devices are plug and play configurable devices.*

*72. The system of claim 70 wherein said plurality of devices comprises:*

*an I/O device; and*

*a processor.*

*73. The system of claim 72 wherein said power management software, if executed, places said I/O device in a reduced power consumption state if said I/O device is inactive for a first duration.*

*74. The system of claim 73 wherein said power management software, if executed, places said processor in a reduced processor power consumption state if said system is inactive for a second duration.*

*75. The system of claim 73 wherein the power manager operates at a kernel level of an operating system for the system, and wherein said device manager comprises a plug and play manager.*

*76. The system of claim 75 wherein said power management software, if executed, communicates with said plug and play manager to update data structures if configuration changes occur to allow power management of dynamically reconfigurable devices.*

*77. The system of claim 70 wherein said power management software, if executed, provides support for idle detection said plurality of devices.*

*78. A system comprising:*

*a device;*

*a processor;*

*a memory containing power management software which, if executed by said system*

*coordinates power management for a plurality of devices; and*

*registers with a configuration manager to be notified of configuration changes for any of said plurality of devices.*

* * * * *